Figure 1:
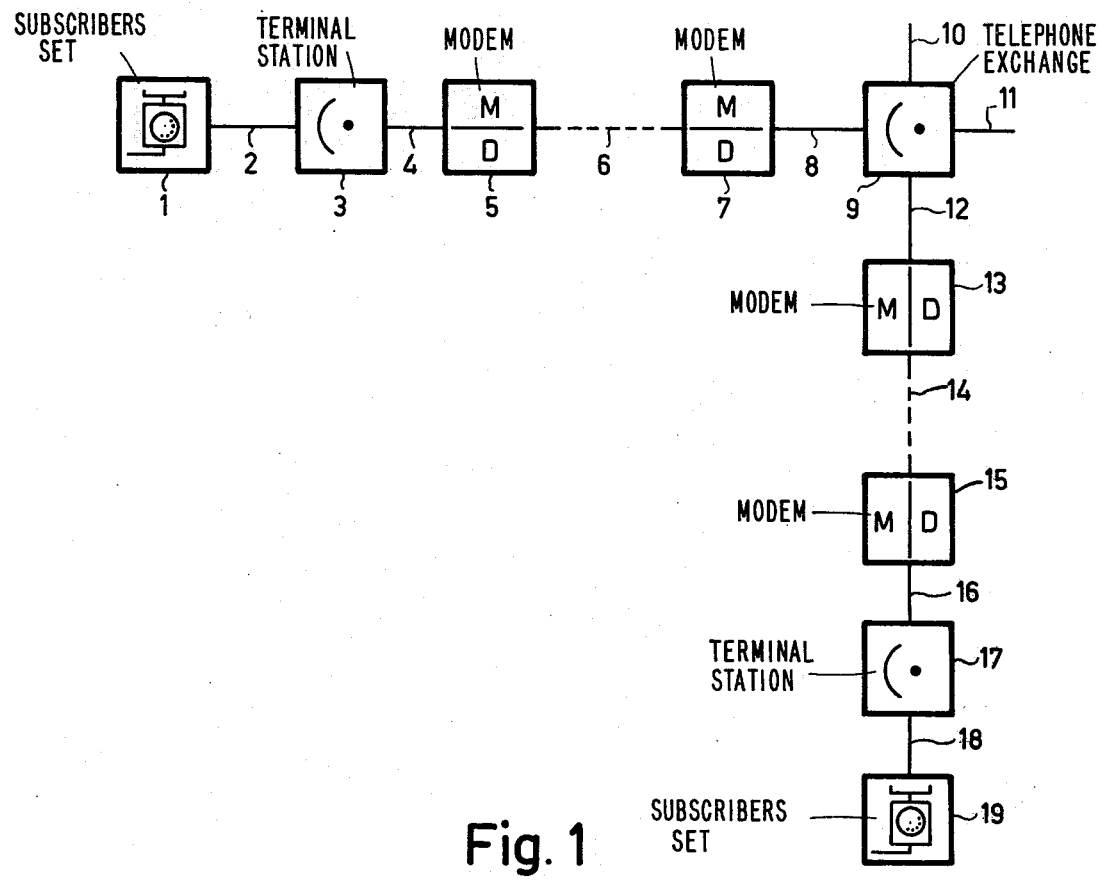

United States Patent [19]

Dornaus et al.

[11] 4,013,956
[45] Mar. 22, 1977

[54] TELECOMMUNICATION SYSTEM WITH AUTOMATICALLY SWITCHED MODEMS

[75] Inventors: Johannes Dornaus; Jürgen Lahmer; Bernd Refflinghaus, all of Nuremberg, Germany

[73] Assignee: U.S. Philips Corporation, New York, N.Y.

[22] Filed: May 5, 1975

[21] Appl. No.: 574,614

[30] Foreign Application Priority Data

May 9, 1974 Germany .......................... 2422504

[52] U.S. Cl. .................................. 325/22; 325/10; 325/3
[51] Int. Cl.² ........................................ H04B 1/44
[58] Field of Search ................ 325/21, 22, 9, 10, 3; 179/2 E, 2.5 R, 41

[56] References Cited

UNITED STATES PATENTS

| | | | |
|---|---|---|---|
| 3,254,159 | 5/1966 | Condict | 325/22 |
| 3,366,880 | 1/1968 | Driver | 325/22 |
| 3,743,938 | 7/1973 | Davis | 325/3 |
| 3,917,907 | 11/1975 | Bartelink | 179/2.5 R |

Primary Examiner—Benedict V. Safourek
Assistant Examiner—Jin F. Ng
Attorney, Agent, or Firm—Frank R. Trifari; Simon L. Cohen

[57] ABSTRACT

A telecommunication system in which two terminal stations are coupled to one another via a telephone exchange and the transmission paths between the exchange and the terminal stations are provided with pairs of modems for transmitting, via the transmission paths, information signals of modulation types which are different in the terminal stations and in the transmission paths, the modems nearer to the exchange being switched off by means of an auxiliary signal the frequency of which corresponds to a component of the frequency spectrum of the modulation type employed in the transmission path. Thus information transmission in the telephone exchange is obtained in the same modulation type as employed in the transmission paths so that unnecessary conversion from one type of modulation to the other is avoided.

4 Claims, 2 Drawing Figures

TELECOMMUNICATION SYSTEM WITH AUTOMATICALLY SWITCHED MODEMS

The invention relates to a telecommunication system comprising two terminal stations which for the transmission of information signals are coupled to one another via a transmission path including at least one telephone exchange, at least one pair of modems which are included in one of the parts into which the transmission path is divided by the telephone exchange and serve to convert a given type of modulation into a given different type suitable for the part of the transmission path lying between the said modems and vice versa. The different types of modulation are, for example, amplitude modulation, as used in the carrier frequency technique, and pulse modulation, such as delta modulation or pulse code modulation.

Such a telecommunication system is generally known. For example, the existing telephone network is arranged so that in the telephone exchanges the information signals are handled in the base band, i.e. in the speech band of 300 to 3,400 Hz, only, whilst the transmission via a long transmission path may be effected both in the base band and in a high-frequency carrier band. Furthermore such a telephone network has new transmission paths added to it via which information signals are transmitted not only by means of amplitude modulation, as used in carrier telephony or in baseband transmission, but also in another modulation mode, for example pulse modulation. In such case also the information signals must be transmitted via the telephone exchanges of the telephone network and must be enabled to reach any subscriber connected to the network. In principle any subscriber of the telephone network must be capable of communicating with any other subscriber. Hence it is necessary that a transmission path arranged for the given other type of modulation is provided, at a point preceding a telephone exchange, with a combination of a demodulator and a modulator (modem) so that an information signal transmitted via this path is transposed by the demodulator to the base band and is transmitted via the telephone exchange in this band. The information signal can than be transmitted further via a transmission path suitable for information transmission in the base band. If this further information transmission is to take place via a transmission path also arranged for the said given other modulation type, at a point following the exchange the information signal must again be converted to this given modulation type by the modulator, which means that the information signal is converted twice. Furthermore there may be still longer transmission paths between the modems and the telephone exchanges.

The said double conversion of the information signal, once before and once after each telephone exchange, is undesirable and may give rise to disturbances. In addition, at each conversion the signal-to-noise ratio is reduced, which may give rise to considerable deterioration of the transmission quality, in particular in the case of multiple conversion in a circuit of a transmission path including a plurality of telephone exchanges, specifically when pulse code modulation or delta modulation is used. Hence appropriately in all cases in which after a telephone exchange transmission is not to be effected in the base band but is to take place in the given other modulation type, in order to avoid multiple conversion the modem is switched off or by-passed and the message is transmitted through the telephone exchange in the said given other modulation type.

It is an object of the present invention in a telecommunication system of the aforementioned type in which a telephone exchange in a transmission path is situated between two parts of this path which are adapted to the said given other modulation type to automatically render inoperative the modems before and after the exchange and to maintain them in the inoperative condition during the subsequent telecommunication transmission in the said given other modulation type.

It is another object of the invention to simultaneously test the connecting path between the said modems which passes through the telephone exchange to ascertain whether this connecting path is suitable to transmit the information signal in the given other modulation type. For this purpose no direct-current connection via the telephone exchange should be required, permitting transmission paths to be used which are free from direct current.

The telecommunication system according to the invention is characterized in that of the pair of modems the one nearer to the telephone exchange includes a signalling receiver which on detection of a given signalling signal supplies a start signal at an output, and an auxiliary signal generator which is connected to this output and under the control of the start signal delivers, via the telephone exchange, to another part of the transmission path connected to this exchange an auxiliary signal constituted by at least one frequency component which occurs in the frequency spectrum of the said second modulation type, and in that the said modem which is nearer to the telephone exchange includes an auxiliary signal detector by which, on detection of the said frequency component in a signal originating via the telephone exchange from another part of the transmission path connected to the exchange, a switching signal is delivered, and switching means which are connected to the auxiliary signal detector and by which this modem can be switched off under the control of the switching signal.

A further embodiment of the invention consists in that the auxiliary signal is a pilot signal having a given amplitude and in that the detector includes a threshold device, the detector delivering the switching signal when the said receiver frequency component exceeds the threshold value of the threshold device.

Figure 2:
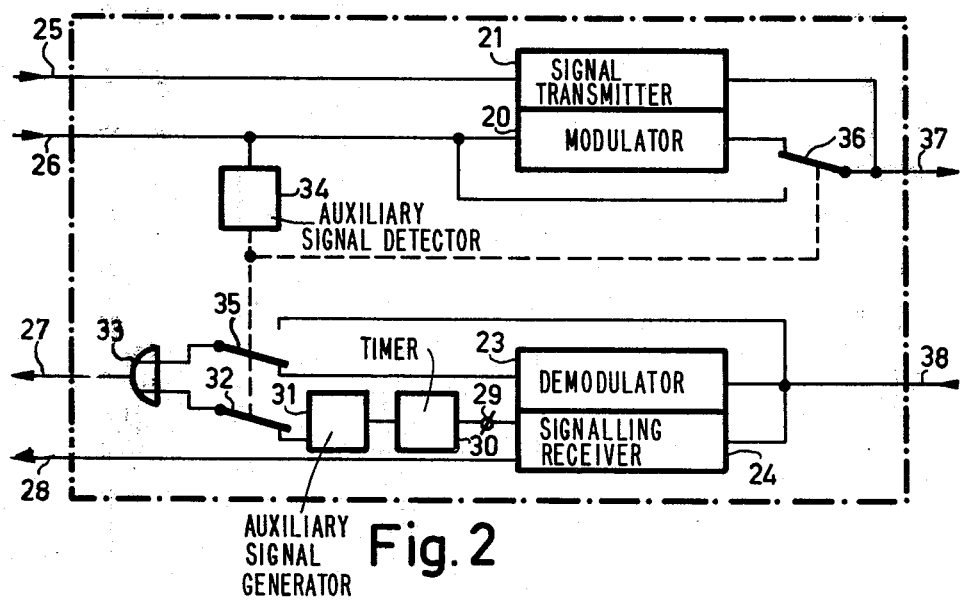

An embodiment of the invention will now be described, by way of example, with reference to the accompanying diagrammatic drawings, in which:

FIG. 1 is a block schematic diagram of a telecommunication system in which the invention is used, and FIG. 2 is a block schematic diagram of a combination of a modulator and a demodulator (modem) according to the invention.

Referring now to FIG. 1, in the telecommunication system shown the messages are transmitted by means of different types of modulation. The subscriber's set 1 is connected to an associated terminal station 3 by a two-wire line 2. Transmission between the subscriber's set 1 and the terminal station 3 is effected in the base band, i.e. in the frequency range from 300 to 3,400 Hz. The terminal station 3 is connected via a connecting line 4 to a part 6 of the transmission path which is suitable for a given other type of modulation, for example delta modulation. A further type of modulation used in this system is amplitude modulation as commonly employed in carrier frequency technology.

Conversion from the amplitude modulation used in the base band on transmission line 4 to the given other modulation type and vice versa is performed at the end of the part 6 nearer to the transmission line 4 by means of the combination 5 of a modulator and a demodulator (modem). The transmission line 4 between the terminal station 3 and the modem 5 must be a six-wire line, two pairs serving for the transmission of speech signals in the two signal transmission directions whilst the remaining two wires serve as signalling wires for the two directions of signal transmission.

The transmission path 6 may be in the form of a cable but may also be a radio link, for example a beam link. Furthermore a multiplex device may be connected between the modem 5 and the part 6 of the transmission path, for example to enable more than one call to be simultaneously transmitted via this part.

The part 6 of the transmission path includes another modem 7 at the end more remote from the subscriber's set 1. This modem performs the conversion from the given other modulation type to amplitude modulation in the base band and conversely. The modem 7 is connected to a telephone exchange 9 via a six-wire transmission line 8, in which also two pairs serve to transmit the call and the two remaining wires serve to transmit the signalling. It is not necessary for the modem 7 to be located in the immediate vicinity of the exchange 9, but it may be spaced therefrom by a suitable distance, and the length of the transmission line 8 may be 1 or 2 km.

In FIG. 1, the telephone exchange 9 is connected not only to the modem 7 by the line 8 but also to other units of the network by outgoing and incoming lines 10, 11 and 12. This illustrates that the exchange 9 as a node exchange may be connected to other node exchanges and terminal stations. The lines 10 and 11 are arranged for signal transmission in the base band and may lead to equipment from which further transmission is effected by means of carrier telephony. The line 12 is connected via a third modem 13 to a part 14 of the transmission path which is arranged for the given other modulation type and at the end of which a further modem 15 is provided which is connected via transmission line 16 to a terminal station 17. The terminal station 17 is connected via a two-wire line 18 arranged for signal transmission in the base band to a subscriber's set 19. The equipment between the exchange 9 and the subscriber's set 19 corresponds to that included between the subscriber's set 1 and the exchange 9, and the modems 5, 7, 13 and 15 are equal to one another.

FIG. 2 is a block schematic diagram of an embodiment of a combination of a modulator and a demodulator (modem) according to the invention. Each modulator 20 has an associated signalling transmitter 21, and each demodulator 23 has an associated signalling receiver 24. Via a wire 25 signalling signals are supplied by the terminal station 3 or the exchange 9 to the signalling transmitter 21. The signalling transmitter 21 converts these signals and transmits them via a transmission path 37 in the frequency band of the said other modulation type. The signalling signals received in the opposite direction by the signalling receiver 24 from the transmisson path 38 are also converted and supplied via a wire 28 to the terminal station 3 or the exchange 9. Via a two-wire line 26 the incoming speech signals in the base band are supplied to the modulator 20. This converts the speech signals to the given other modulation type. Correspondingly, speech signals in the given other modulation type arriving from the opposite direction are reconverted to the base band by means of the demodulator 23 and supplied to the terminal station 3 or to the exchange 9 via a two-wire line 27.

The output 29 of the signalling receiver 24 is connected via a timer 30 to an auxiliary-signal generator 31 which generates an auxiliary signal. This auxiliary signal comprises at least one frequency component which occurs in the frequency spectrum of the said other modulation type. The component preferably does not lie in the frequency range of the base band between 300 and 3,400 Hz. Its level is selected to be approximately equal to the level at which the frequency occurs in the said frequency spectrum. Preferably it is selected so as to lie near the upper end of this frequency spectrum. The auxiliary signal can be delivered on the two-wire line 27 via a switch 32, which is closed in the normal condition, and an OR gate 33. The switch 32 is operated by an auxiliary-signal detector 34 the input of which is connected to the incoming two-wire line 26. To the detector 34 switching means 35 and 36 are connected by means of which both the modulator and the demodulator can be rendered inoperative. This is effected in that when the switches 35 and 36 are changed over the modulator and the demodulator are bypassed, the incoming two-wire line 26 being directly connected to the outgoing transmission path 37 whilst the incoming transmission path 38 is directly connected to the outgoing two-wire line 27.

When a connection is to be established between the subscriber's set 1 and the subscriber's set 19, the handset of the station 1 is lifted, whereupon the dialing signal is supplied from the terminal station 3 to the subscriber's set 1. Then the number of the subscriber's set 19 is sent by the set 1. The terminal station 3 hunts for a free transmission path to the exchange 9. The free transmission path is engaged in that a given signalling signal, generally referred to as engaged signal, for example a pulse, is applied via the signalling wire 25 to the first modem 5. In this modem the engaged signal is converted in the signalling transmitter 21 and transmitted via transmission path 6, 37 in the signalling channel of this transmission path to the second modem 7. The signalling receiver 24 in the second modem 7 transmits the engaged signal to the exchange 9 via the signalling wire 28, 8. In the opposite direction an answer signal is transmitted as the given signallig signal in response to a received engaged signal from the exchange to the terminal station 3 in the same manner. In the modems 5 and 7 the modulators and demodulators are operative, i.e. transmission can take place in the base band. The switches 32, 35 and 36 are in the positions shown in FIG. 2, which means that the switch 32 is closed.

On reception of the engaged signal in the modem 5 or on reception of the answer signal in the modem 7 a start signal is applied via the timer 30 for a given time to the auxiliary signal generator 31 which in response sends the auxiliary signal. In both cases this does not affect further completion of the connection, because the exchange 9 has not yet set up a connection and the subscriber's set 1 cannot handle the answer signal and the auxiliary signal. The auxiliary-signal generator 31 remains operative during the entire dialling period and for a short time thereafter. The operational time is determined by the timer 30. It is such that the time required to set up a connection in the exchange 9 and the time required for detection and switching in the modem 7 can be bridged. This applies also to the modem 13.

Thereupon the exchange 9 receives the dialling information from the subscriber's set 1 and this information is transmitted in the same manner as the engaged or answer signals. After the exchange 9 has received the complete dialling information it establishes a connection to the terminal station 17.

When the modem 13 receives the engaged signal from the terminal station 17, the auxiliary signal generator 31 associated with the modem 13 is switched on for a time determined by the associated timer 30 and the resulting auxiliary signal is superposed via the OR gate 33 on the low-frequency noise of the demodulator 3. There cannot yet be a speech or information signal, because there is not yet a connection between the subscriber's set 1 and the subscriber's set 19.

The auxiliary signal detector 34 in the modem 7 receives the auxiliary signal sent by the auxiliary signal generator 31 of the modem 13 and thus learns that the transmission path 14 also uses the given other modulation type or is arranged therefor. The auxiliary signal detector 34 in the modem 7 then switches off both the modulator and the demodulator by changing over the switches 35 and 36. Consequently no conversion to or from the base band can be effected. At the same time the switch 32 is opened.

Thus the two-wire line 27 of the modem 7 no longer carries the low-frequency noise but a noise corresponding to the given other modulation type. The latter noise contains the frequency component which corresponds to the frequency of the auxiliary signal and has sufficient power to cause the auxiliary signal detector 34 in the modem 13 to respond so that it switches off the modulator and the demodulator. The two detectors 34 of the modems 7 and 13 remain operative via the frequency component which corresponds to the frequency of the auxiliary signal and is contained with sufficient strength in the frequency band used for the given other modulation type.

From the exchange 9 an answer signal is transmitted to the terminal station 17 in response to the engaged signal transmitted by this station to the exchange 9. Thus the terminal stations 3 and 17 are interconnected via the exchange 9.

The subscriber's set 19 is called by the terminal station 17. When the receiver of the set 19 is lifted, there is a transmission path between the two subscriber's sets 1 and 19, signal transmission being effected in the given other modulation type in the part situated between the modems 5 and 15. Conversion to the base band then is performed only by the modems 5 and 15.

The line 8 connecting the modem 7 and the exchange 9 may be very long, or it may be short but unsatisfactory for the given other modulation type. In both cases this connection is not suitable for transmitting an information signal in the given other modulation type, although signal transmission in the base band is possible. In such cases, in this part of the transmission path the auxiliary signal is attenuated in a degree such that the auxiliary signal detectors 31 cannot become operative, for example in that they include a threshold device the threshold value of which is not exceeded by the auxiliary signal received. Thus the modulators or demodulators are not rendered inoperative and signal transmission in the exchange 9 is effected in the base band.

This is also the case if only one of the two directions gives rise to considerable attenuation of the auxiliary signal. It is sufficient if, for example, the detector 34 in the modem 7 cannot detect the auxiliary signal and hence does not switch the associated modulator and demodulator out of circuit. After the interval determined by the timer 30 the auxiliary signal generator 31 is switched off but the modem 13 is not switched off, because the rest noise of the given other modulation type does not occur. In such a case also there is an unambiguous switching condition.

In this manner according to the invention the transmission path via the exchange 9 between the modems 7 and 13 is tested. A further improvement is obtained by selecting as the auxiliary signal a frequency from the upper range of the frequency spectrum used in the given other modulation type. Consequently testing is particularly effective, because the attenuation of a transmission line as a rule increases at higher frequencies.

The transmission system according to the invention has the advantage that the auxiliary signal used can readily be generated and can be detected substantially without any ambiguity, even if transmission equipment of comparatively poor quality is used so that, for example, the carrier residues of carrier frequency systems are comparatively large or clock frequencies from the exchange penetrate into the transmission path.

It should be mentioned that the transmission system according to the invention may readily be arranged so that instead of the auxiliary signal generator of the modem 13 that of the modem 7 is used. The auxiliary signal then is detected, in a manner similar to that described hereinbefore, in the detector of the modem 13 so that the modem 13 is switched off. The low-frequency rest noise of the signal delivered by the modem 13 is in this case replaced by the rest noise corresponding to the given other modulation type. This is detected in the modem 7 in a manner similar to that described hereinbefore, so that this modem is switched off.

What is claimed is:

1. Telecommunication system of the type comprising two terminal stations which are coupled to one another for the transmission of information signals via a transmission path which includes at least one telephone exchange, at least one pair of modems which are included in one of the parts into which the telephone exchange divides the transmission path and serve to convert a given modulation type to a given other modulation type suitable for the part of the transmisson path situated between the said modems and vice versa, the improvement wherein of the pair of modems the one nearer to the exchange includes a signalling receiver means responsive to the detection of a given signalling signal from a terminal station for delivering a start signal at an output, and an auxiliary-signal generator means connected to that output for supplying, under the control of the start signal, an auxiliary signal constituted by at least one frequency component occurring in the frequency spectrum of the said second modulation type to another part of the transmission path, which part is connected to the said telephone exchange, said modem nearer to the telephone exchange including an auxiliary-signal detector means responsive to the detection of the said frequency component in a signal originating via the telephone exchange from another part of the transmission path connected to the telephone exchange for delivering a switching signal, and switching means connected to the auxiliary signal detector and to the auxiliary signal generator for disconnecting said auxiliary signal generator and for shunting this modem under the control of the switching signal.

2. Telecommunicating system as claimed in claim 1, wherein the auxiliary signal is a pilot signal of a given amplitude, and the detector includes a threshold device arranged so that the detector delivers the switching signal when the said received frequency component exceeds the threshold value of the threshold device.

3. Telecommunication system as claimed in claim 1, wherein the auxiliary signal is a frequency from the upper range of the frequency band employed by the said other modulation type.

4. Telecommunicaton system as claimed in claim 1 further comprising a timer coupled to the auxiliary signal generator for switching off the auxiliary-signal generator after a predetermined time after it has been switched on.

* * * * *